United States Patent
Lin et al.

(10) Patent No.: US 10,142,543 B1
(45) Date of Patent: Nov. 27, 2018

(54) POWER REDUCTION IN A MULTI-SENSOR CAMERA DEVICE BY ON-DEMAND SENSORS ACTIVATION

(71) Applicant: MediaTek Inc., Hsinchu (TW)

(72) Inventors: Po-Hsun Lin, Taoyuan (TW);
Cheng-Che Chen, New Taipei (TW);
Shih-Min Cheng, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 13 days.

(21) Appl. No.: 15/593,800

(22) Filed: May 12, 2017

(51) Int. Cl.
*H04N 5/232* (2006.01)
*H04N 5/225* (2006.01)
*H04N 9/09* (2006.01)
*H04N 5/265* (2006.01)
*H04N 5/235* (2006.01)

(52) U.S. Cl.
CPC ....... *H04N 5/23241* (2013.01); *H04N 5/2258* (2013.01); *H04N 5/2351* (2013.01); *H04N 5/23216* (2013.01); *H04N 5/23293* (2013.01); *H04N 5/265* (2013.01); *H04N 9/09* (2013.01)

(58) Field of Classification Search
CPC ............. H04N 5/23241; H04N 5/2258; H04N 5/23216; H04N 5/23293; H04N 5/2351; H04N 5/265; H04N 5/247; H04N 5/23296; H04N 9/09
USPC .................................................... 348/240.99
See application file for complete search history.

(56) References Cited

U.S. PATENT DOCUMENTS

| | | | |
|---|---|---|---|
| 7,738,016 B2* | 6/2010 | Toyofuku | H04N 5/262 348/240.1 |
| 8,542,287 B2* | 9/2013 | Griffith | H04N 5/2251 348/218.1 |
| 8,913,145 B2* | 12/2014 | Griffith | H04N 5/2251 348/218.1 |
| 9,420,190 B2* | 8/2016 | Griffith | H04N 5/2251 |
| 9,568,713 B2* | 2/2017 | Laroia | G06T 11/60 |
| 9,811,753 B2* | 11/2017 | Venkataraman | G06T 9/00 |
| 9,858,673 B2* | 1/2018 | Ciurea | H04N 13/232 |
| 9,860,456 B1* | 1/2018 | Musatenko | H04N 5/2621 |
| 9,917,998 B2* | 3/2018 | Venkataraman | H04N 5/2258 |
| 9,942,474 B2* | 4/2018 | Venkataraman | H04N 5/23232 |
| 2006/0187338 A1* | 8/2006 | May | H04N 5/2254 348/375 |
| 2010/0238327 A1* | 9/2010 | Griffith | H04N 5/2251 348/240.99 |
| 2016/0241793 A1 | 8/2016 | Ravirala et al. | |
| 2017/0094141 A1* | 3/2017 | Hicks | H04N 5/2258 |
| 2017/0150067 A1* | 5/2017 | Han | H04N 5/23229 |
| 2017/0374306 A1* | 12/2017 | Vaartstra | H04N 5/3696 |
| 2018/0041742 A1* | 2/2018 | Stetson | H04N 9/045 |

* cited by examiner

*Primary Examiner* — Pritham Prabhakher
(74) *Attorney, Agent, or Firm* — Tong J. Lee

(57) ABSTRACT

A dual-camera devices operates with two cameras turned on in response to an indication detected from a user interface that a change to a zoom factor is to occur and before the change is stabilized. The device selects one of the two cameras according to a stable point of the zoom factor. The device displays images sensed by the selected one of the two cameras when the zoom factor reaches the stable point.

6 Claims, 10 Drawing Sheets

FIG. 2A                    FIG. 2B

POWER REDUCTION IN A MULTI-SENSOR CAMERA DEVICE BY ON-DEMAND SENSORS ACTIVATION

TECHNICAL FIELD

Embodiments of the invention relate to power management of a camera device that controls the activation of image sensors based on demand.

BACKGROUND

Modern imaging devices, such as digital cameras, may be built into portable consumer electronics, such as tablets, mobile phones and smart portable or wearable devices, and rely on battery power to operate. To enhance the image quality, a portable device may be equipped with more than one camera, and each camera may have multiple sets of sensors. Having all these sensors on at the same time can consume a significant amount of battery power and increase the device temperature. Turning off the unused sensors may increase response time when an unused sensor needs to be turned on in response to a change to the operating condition of the camera.

Thus, there is a need for improvement in the management of sensor activation in digital cameras to allow for fast response time and power reduction.

SUMMARY

In one embodiment, a method is provided for power management of a dual camera device including two cameras. The method comprises: detecting, from a user interface, an indication that a change to a zoom factor is to occur; in response to the indication, operating with the two cameras turned on upon detecting the indication before the change is stabilized; selecting one of the two cameras according to a stable point of the zoom factor; and displaying images sensed by the selected one of the two cameras when the zoom factor reaches the stable point.

In another embodiment, a method is provided for power management of a camera device with dual sensors including a color sensor and a monochromatic sensor. The method comprises: detecting a value of a light sensitivity setting for an image; in response to a first determination that the value is greater than a first threshold and less than a second threshold, operating the camera device with both the color sensor and the monochromatic sensor turned on wherein the second threshold is greater than the first threshold and marks a boundary between the color sensor's operating range for image capture and the dual sensors' operating range for image capture; and in response to a second determination that the value is greater than a second threshold, operating the camera device with both the color sensor and the monochromatic sensor turned on.

In yet another embodiment, a dual camera device is provided to perform power management. The dual camera comprises: a user interface; two cameras; a display; and a processor coupled to the user interface, the two cameras and the display. The processor is operative to: detect, from the user interface, an indication that a change to a zoom factor is to occur; in response to the indication, operate with the two cameras turned on upon detecting the indication before the change is stabilized; select one of the two cameras according to a stable point of the zoom factor; and process images sensed by the selected one of the two cameras for the display when the zoom factor reaches the stable point.

In yet another embodiment, a camera device is provided to perform power management. The camera device comprises: dual sensors including a color sensor and a monochromatic sensor; and a processor coupled to the color sensor and the monochromatic sensor. The processor is operative to: detect a value of a light sensitivity setting for an image; in response to a first determination that the value is greater than a first threshold and less than a second threshold, operate with both the color sensor and the monochromatic sensor turned on wherein the second threshold is greater than the first threshold and marks a boundary between the color sensor's operating range for image capture and the dual sensors' operating range for image capture; and in response to a second determination that the value is greater than a second threshold, operate with both the color sensor and the monochromatic sensor turned on.

The embodiments of the invention enable a camera device to reduce power consumption without sacrificing the response speed of its image sensors. Advantages of the embodiments will be explained in detail in the following descriptions.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for power management of a device that includes function units performing digital image capture and display, such as a digital camera. In the following, the device is sometimes referred to as a camera device, although it is understood that the device may be any electronic device that includes one or more cameras. In a first embodiment, the device includes dual cameras such as a wide-angle camera (including a wide-angle image sensor) and a telephoto camera (including a telephoto image sensor). The dual cameras are positioned to face the same direction, but have different focal lengths and operate with different zoom factors. In a second embodiment, the device includes a color image sensor and a monochromatic image sensor, both of which operate to process the images received by a camera.

Embodiments of the camera device keep only one image sensor in an active state of sensing and outputting images during operation to reduce power consumption. The other image sensor, if in a power-off state, transitions into the active state when a demand is detected. In the first embodiment, the demand is detected when an indication of a zoom factor change is received from the user interface; in the second embodiment, the demand is detected when a color sensitivity indicator (e.g., the International Standards Organization (ISO) value) rises above a given threshold. Thus, when a demand is detected, the camera device operates with both image sensors turned on to reduce the transition time between the sensors. When a demand is not detected, only one of the image sensors is turned on to reduce power consumption.

Figure 1:
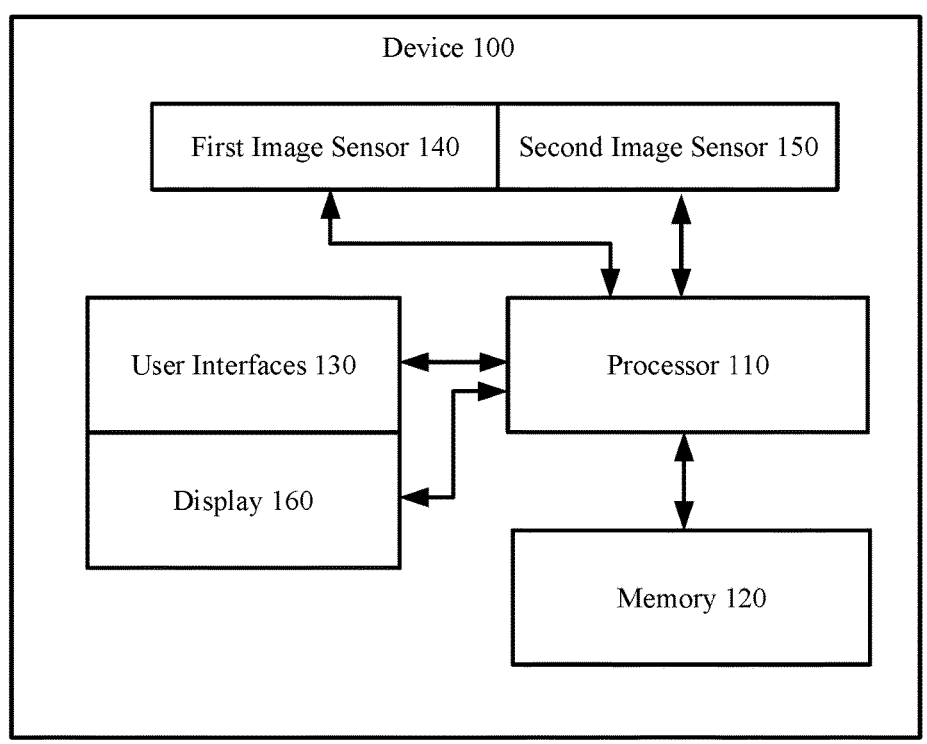
FIG. 1 illustrates an example of a device having dual image sensors according to one embodiment.
Figure 2:
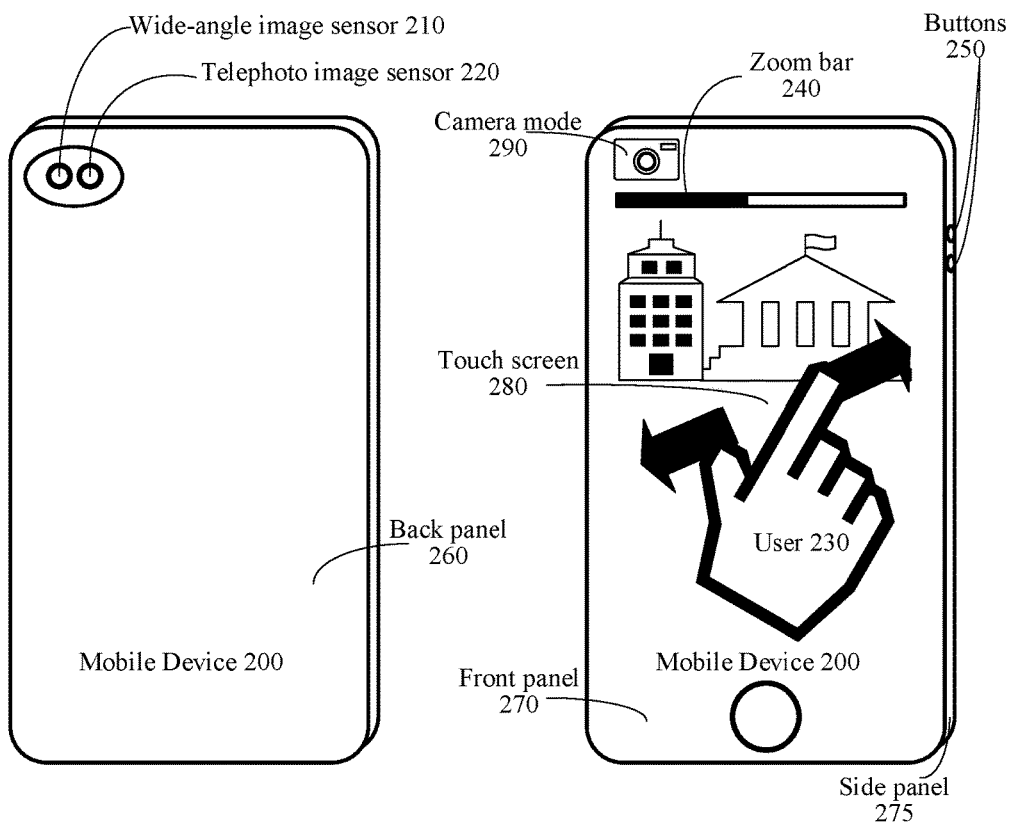
FIG. 2A is an example of a device having dual cameras on the back panel according to one embodiment.
FIG. 2B is an example of the device of FIG. 2A having a number of user interfaces on the front and side panels according to one embodiment.

FIG. 1 illustrates an example of a device 100 that include dual image sensors according to one embodiment. The device 100 includes a processor 110 performing image processing and power management for image sensors including a first image sensor 140 and a second image sensor 150. The processor 110 is connected to a memory 120, such as a combination of volatile memory and non-volatile memory, a display 160 and user interfaces 130, such as a touch screen, one or more buttons, a touch pad, etc. Although the user interface 130 and the display 160 are shown as two separate components, some of the user interfaces 130 (e.g., a touch screen) may be integrated into the display 160. In an embodiment, the memory 120, the user interfaces 130, the image sensors 140, 150, and the display 160 may be interconnected with a bus or a similar interconnection. The device 110 may be a standalone imaging device; e.g., a camera, a camcorder, etc., or may be part of a computing and/or communication system; e.g., smartphone, laptop, smartwatch, or other portable or wearable devices. For simplicity of the illustration device 100 may include additional elements not shown in FIG. 1; e.g., a battery, an antenna, additional processors, etc.

The image sensors 140 and 150 are two different types of image sensors, as will be described in further detail below. In one embodiment, the processor 110 determines the on/off status of the image sensors 140 and 150. More specifically, the processor 110 determines the operating state of the image sensors 140 and 150; e.g., whether an image sensor is in an active state (turned on) or a power-off state (turned off). Depending on the types of the image sensors 140 and 150, the determination may be based on user input obtained from the user interfaces 130, or based on a setting of the device 100.

In the following, FIGS. 2A, 2B and 3-6 illustrate a first embodiment of the device 100 and its operations; and FIGS. 7-10 illustrate a second embodiment of the device 100 and its operations.

In the first embodiment, the two image sensors 140, 150 of the device 100 have different focal lengths and different zoom factor ranges. For example, the first image sensor 140 may be a wide-angle image sensor and the second image sensor 150 may be a telephoto image sensor. Alternatively, the two image sensors 140, 150 may be any types of image sensors that operate with different zoom factor ranges.

FIG. 2A and FIG. 2B illustrate a back view and a front view of a mobile device 200, respectively, according to one embodiment. The device 100 may be part of the mobile device 200. In FIG. 2A, a back panel 260 of the mobile device 200 includes dual cameras; the first camera includes a wide-angle image sensor 210 and the second camera includes a telephoto image sensor 220. The wide-angle image sensor 210 is an example of the first image sensor 140 of FIG. 1 and the telephoto image sensor 220 is an example of the second image sensor 150 of FIG. 1. In FIG. 2B, a front panel 270 of the mobile device 200 includes a touch screen 280, on which a user 230 may zoom in or zoom out of an image in a camera mode 290 of the mobile device 200. The zoom-in and zoom-out operations may be performed with various options, such as two-finger pinch or expand, slide back or forth on a zoom bar 240, press an increase or a decrease volume button 250 on a side panel 275 or other physical or virtual buttons, other touch down or touch move motions, and the like.

Figure 3:
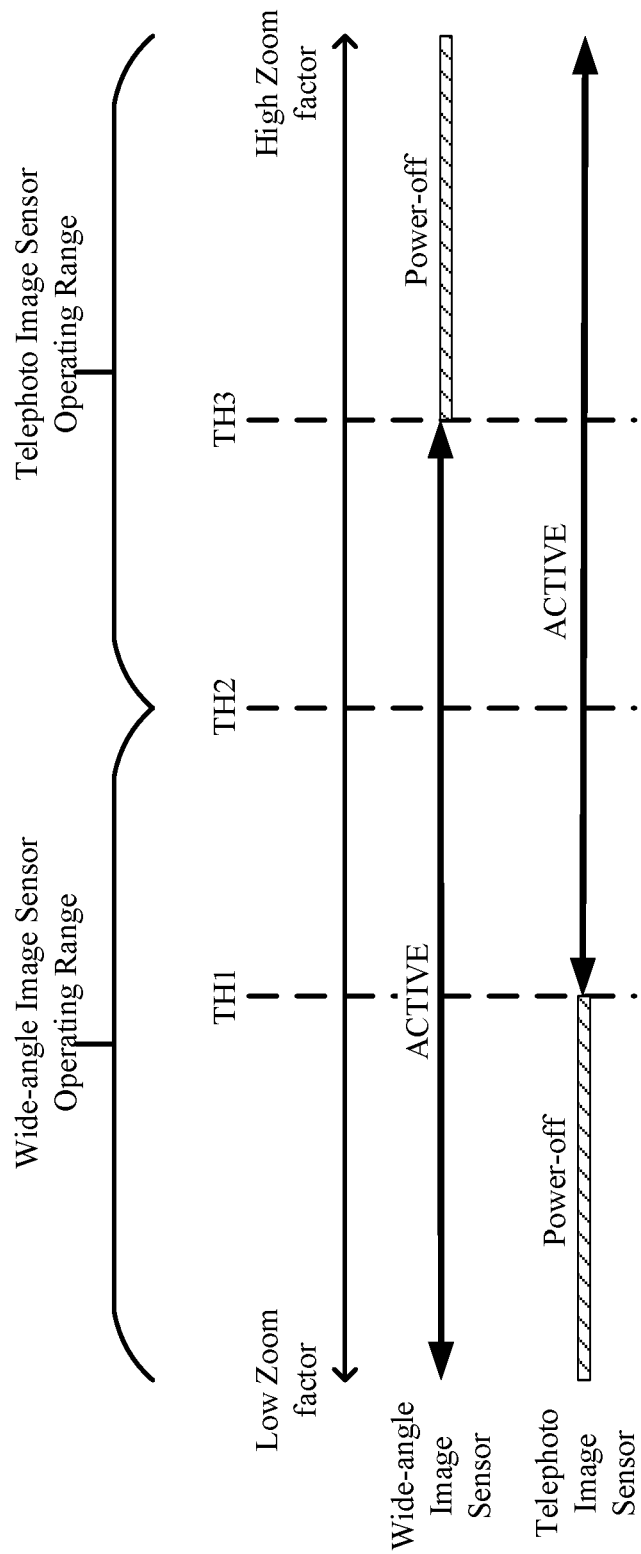
FIG. 3 is a diagram illustrating a number of zoom factor ranges according to one embodiment.

FIG. 3 is a diagram illustrating the respective zoom factor ranges of the sensors 210 and 220 according to one embodiment. Three threshold values are used, TH1<TH2<TH3, to mark the boundaries of the zoom factor ranges. For example, TH1 may represent a zoom factor of 1.5×, TH2 may represent a zoom factor of 2.0×, and TH3 may represent a zoom factor of 2.5×. It is understood that different zoom factors may be used as the thresholds.

In one embodiment, when the zoom factor is no greater than TH2, the wide-angle image sensor 210 is in active operation (i.e., in the active state) and its output is processed for display. When the zoom factor is greater than TH2, the telephoto image sensor 220 is in the active operation and its output is processed for display. When the zoom factor is between TH1 and TH3, both sensors 210 and 220 are turned on and in active state, but only one of their outputs is processed for display. Keeping only one of the two sensors 210 and 220 in the active state during operation when the zoom factor is below TH1 and above TH3 saves power and reduces battery consumption. Keeping both the sensors 210 and 220 in the active state when the zoom factor is in the "intermediate" range (i.e., between TH1 and TH3) reduces the response time when a switchover from one sensor to the other occurs as the zoom factor crosses the TH2 boundary.

Figure 4:
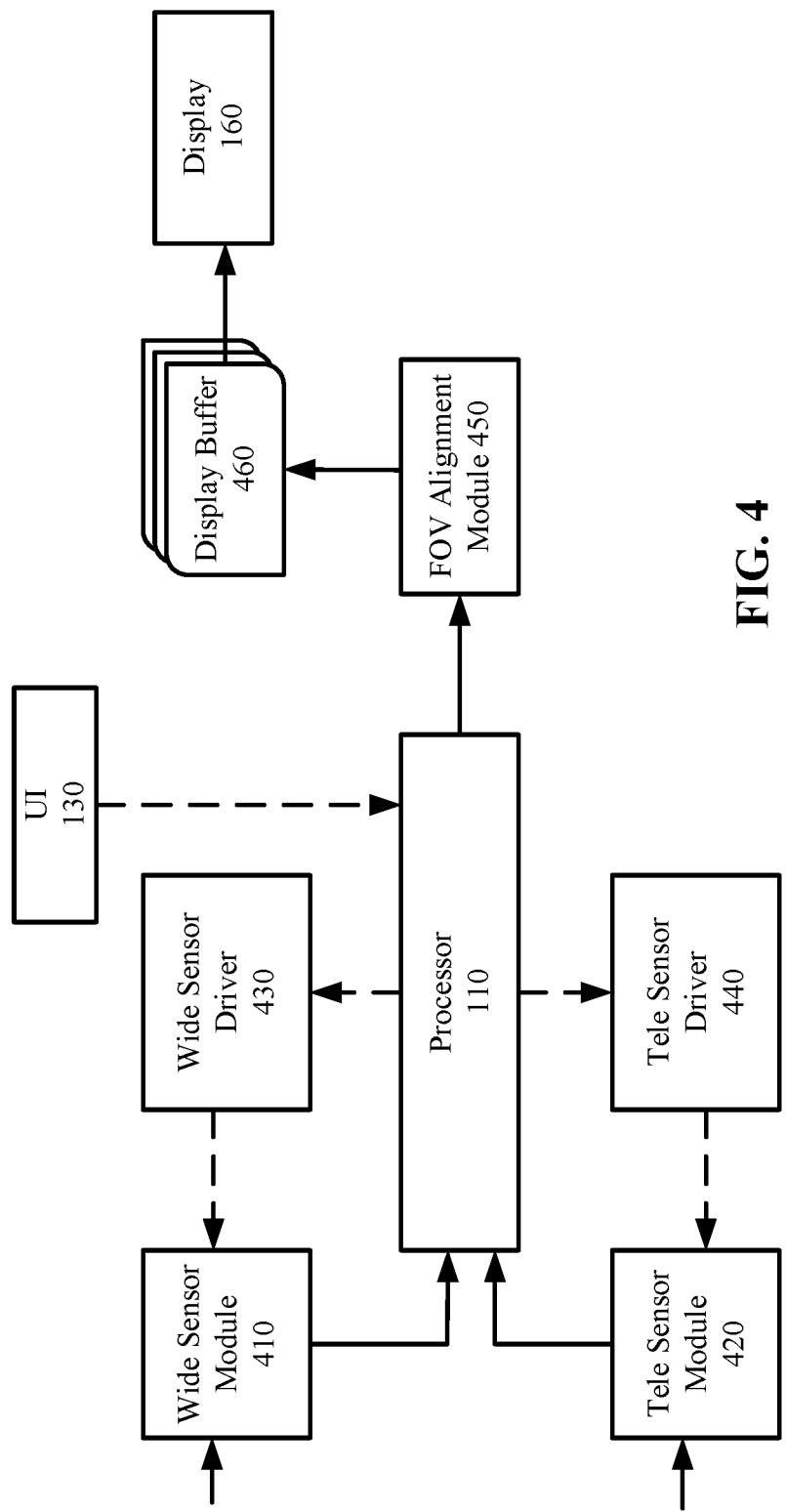
FIG. 4 is a diagram illustrating a dual-camera device according to one embodiment.

FIG. 4 is a block diagram illustrating further details of the first embodiment of the device 100 in FIG. 1. The dashed lines indicate control signals and the solid lines indicates image data flow. In this embodiment, the device 100 is a dual-camera device that includes two cameras. A first camera includes a wide sensor module 410 and a second camera includes a tele sensor module 420. The wide sensor module 410 includes a wide-angle image sensor (e.g., the wide-angle image sensor 210 of FIG. 2) and the tele sensor module 420 includes a telephoto image sensor (e.g., the telephoto image sensor 220 of FIG. 2).

In this embodiment, the processor 110 receives user input from the user interfaces 130 and controls a wide sensor driver 430 and a tele sensor driver 440 accordingly. The wide sensor driver 430 and the tele sensor driver 440, in turn, control the on/off status of the wide sensor module 410 and the tele sensor module 420, respectively. When the zoom factor is in the operating range of the wide sensor module 410 (i.e., when the zoom factor is not greater than TH2), the wide sensor module 410 operates to sense the images in its field of view and the processor 110 processes the sensed images. The images may be further processed by a field-of-view (FOV) alignment module 450 for image alignment. The FOV alignment module 450 aligns images taken by different sensor modules. Thus, when the zoom factor moves across the TH2 boundary and the operating sensor module switches from one to the other, the FOV alignment module 450 can align the images taken by one sensor module with the images taken by the other sensor module. Similarly, when the zoom factor is in the operating range of the tele sensor module 420 (i.e., when the zoom factor is greater than TH2), the tele sensor module 420 operates to sense the images in its field of view and the processor 110 processes the sensed images. The images may be further processed by the FOV alignment module 450 for image alignment. The output of the FOV alignment module 450 is sent to a set of display buffers 460 for the display 160.

When the zoom factor is between TH1 and TH3, both the wide sensor module 410 and the tele sensor module 420 are turned on and in the active state. While in the active state, both sensor modules 410 and 420 sense the image, perform sensor processing, and send the image to the processor 110. The processor 110 chooses one of the sensor modules 410 and 420 to receive and process the image. Having both sensor modules 410 and 420 in the active state allows quick transition from one sensor module to the other sensor module on demand.

Figure 5:
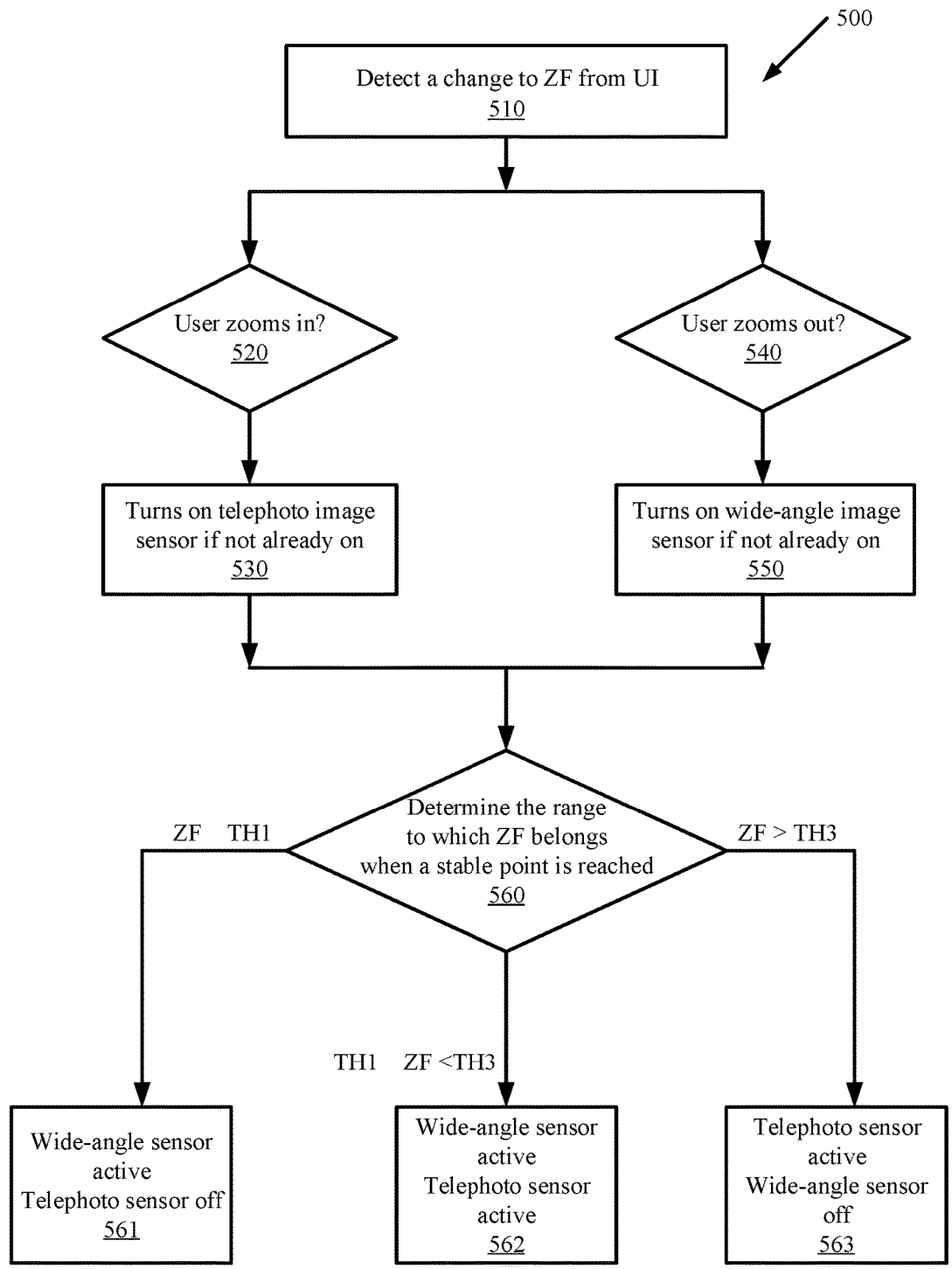
FIG. 5 is a flow diagram illustrating a power management process performed by the dual-camera device of FIG. 4 according to one embodiment.

FIG. 5 is a flow diagram illustrating a power management process 500 for a dual-camera device according to one embodiment. The dual-camera device may include a wide-angle image sensor and a telephoto image sensor operating according to the zoom factor ranges illustrated in FIG. 3. Alternatively, the dual-camera device may include any two different image sensors that operates according to the zoom factor ranges illustrated in FIG. 3. The process 500 may be performed by a device (e.g., the device 100 of FIG. 1, or more specifically, the processor 110 of FIG. 1 and FIG. 4).

The process 500 begins with a processor receiving a signal from a user interface indicating that a zoom factor (indicated as "ZF" in FIG. 5) change is about to occur. At this point, the user may have just begun, or be in the process of, changing the zoom factor of the device. The signal may indicate that the device is in the camera mode and the user is sliding the zoom bar, performing a pinch or expand motion on the touch screen, pressing a button, or using other zooming mechanisms provided on the device, to begin a zoom change. Upon receiving the zoom factor change signal, the processor determines whether the zoom factor change is to zoom in (step 520) or zoom out (step 540). In either case, the device operates with both sensors turned on. In response to a zoom-in zoom factor change (step 520), the processor turns on the telephoto image sensor if it is not already turned on (step 530) and keeps it in the active state. In response to a zoom-out zoom factor change (step 540), the processor turns on the wide-angle image sensor if it is not already turned on (step 550) and keep it in the active state. The zoom factor change is finalized (i.e., stabilized) when the user stops the zoom change motion and the zoom factor stops changing for a predetermined period of time. Before the zoom factor change is stabilized, the active image sensor stays active. When the zoom factor change is stabilized, the zoom factor reaches a stable point. Depending on which zoom factor range this stable point falls in; e.g., ZF≤TH1 (step 561), TH1<ZF≤TH3 (step 562), or ZF>TH3 (step 563), the sensors will be set in their respective state according to the diagram of FIG. 3.

Figure 6:
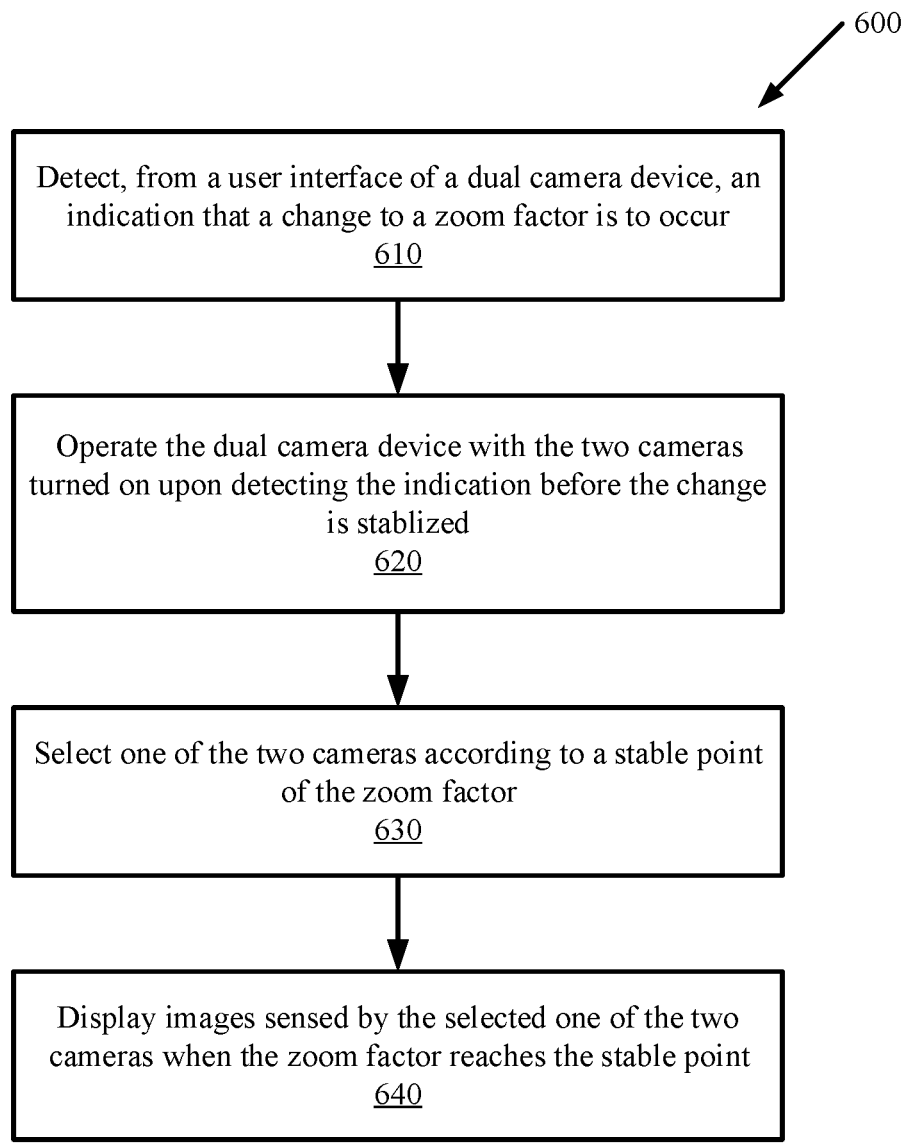
FIG. 6 is a flow diagram illustrating a power management method performed by a dual-camera device according to one embodiment.

FIG. 6 is a flow diagram illustrating a method 600 of power management for a dual-camera device according to one embodiment. In one embodiment, the method 600 may be performed by a device (e.g., the device 100 of FIG. 1, or more specifically, the processor 110 of FIG. 1 and FIG. 4).

The method 600 begins when the device detects, from a user interface, an indication that a change to a zoom factor is to occur (step 610). The dual camera device operates with the two cameras turned on upon detecting the indication before the change is stabilized (step 620). One of the two cameras is selected according to a stable point of the zoom factor (step 630). The device displays images sensed by the selected one of the two cameras when the zoom factor reaches the stable point (step 640).

In the following, FIGS. 7-10 illustrate a second embodiment of the device 100 (FIG. 1) and its operations. In this second embodiment, the two sensors in the device 100 may be a color sensor (e.g., a Bayer sensor) and a monochromatic ("mono") sensor. These two sensors may process the same image stream from the same camera, and therefore, they can be used separately or combined in a single camera. The color sensor is best suited for a low ISO setting (e.g., when the ISO value is not greater than a first threshold THa), where ISO stands for International Standards Organization which is the governing body that sets light sensitivity standards for sensors in digital cameras. The ISO settings determine how sensitive the camera's sensor is to light. When the ISO setting is high (e.g., above a second threshold THb), images captured by the color sensor may be of low quality; e.g., grainy. Thus, it is best to combine the outputs of both the color sensor and the mono sensor to reduce noise in the resulting images.

Figure 7:
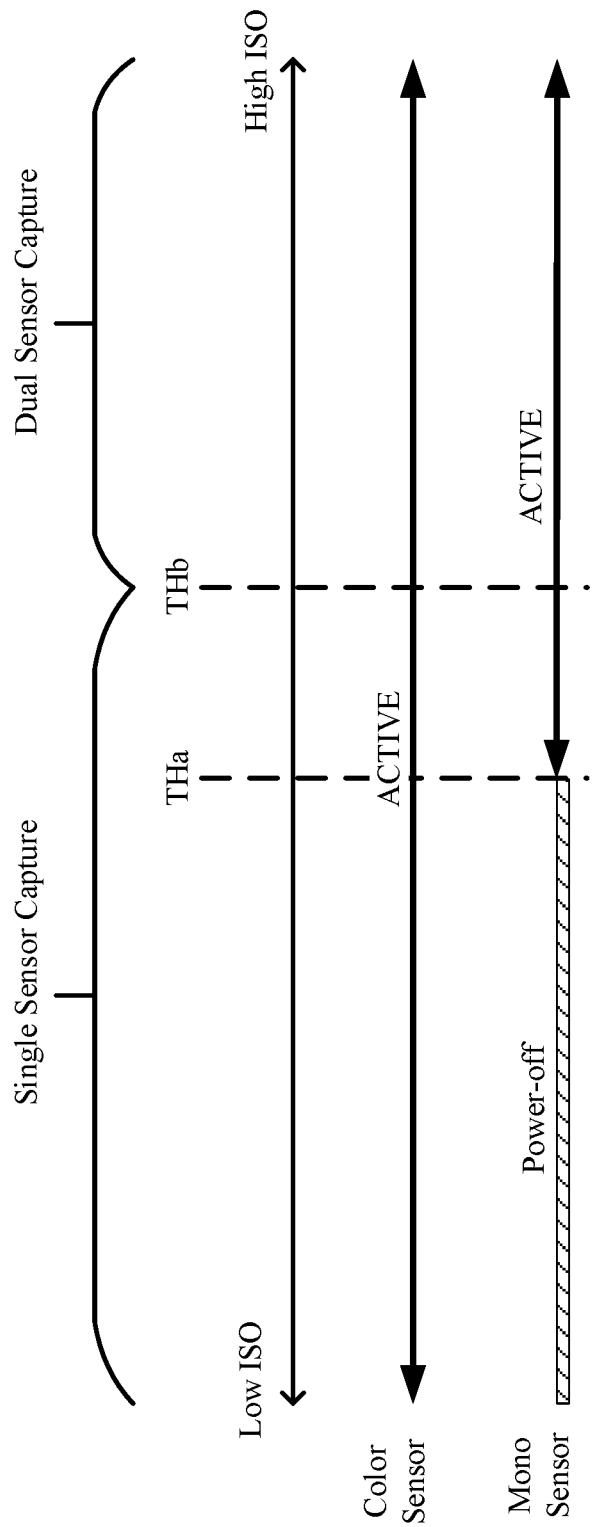
FIG. 7 is a diagram illustrating a number of light sensitivity ranges according to one embodiment.

FIG. 7 is a diagram illustrating the operating ranges of the color sensor and the mono sensor with respect to the ISO values according to one embodiment. Two threshold values are used, THa<THb, to mark the boundaries of the operating ranges. For example, THa may represent an ISO value of 1200 and THb may represent an ISO value of 1600. It is understood that different ISO values may be used as the thresholds.

In one embodiment, the color sensor operates alone when the ISO value is no greater than THa. When the ISO value is between THa and THb, both the color sensor and the mono sensor are turned on and in the active state, but only the color sensor output is processed. When the ISO value is greater than THb, both the color sensor and the mono sensor are in the active state, operating together to reduce the noise in the images that are captured to memory. As used herein, the term "capture an image" means a copy of the image is obtained from the received image stream and stored in the memory of the device. An image sensed by any of the sensors described herein may be viewed ("previewed") on the display without being captured. When a camera device enters a capture mode, a copy of the image viewed on the display is saved into the memory.

Figure 8:
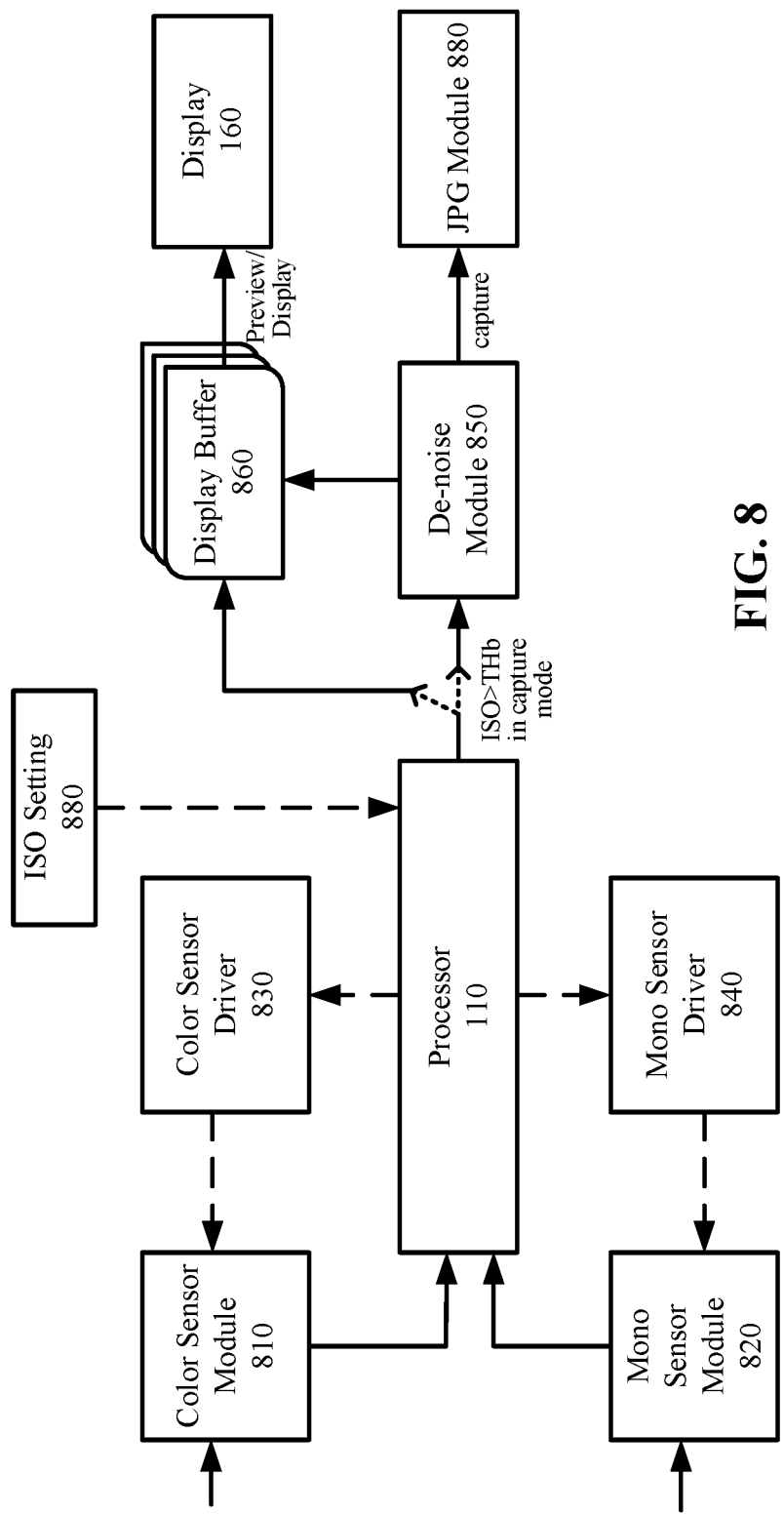
FIG. 8 is a diagram illustrating a device having a color sensor and a monochromatic sensor according to one embodiment.

FIG. 8 is a block diagram illustrating further details of the second embodiment of the device 100 in FIG. 1. The dashed lines indicate control signals and the solid lines indicates image data flow. In this embodiment, the device 100 includes two image sensor modules suited for different light sensitivities: a color sensor module 810 and a mono sensor module 820. The color sensor module 810 includes a color sensor which may be an example of the first image sensor 140 of FIG. 1, and the mono sensor module 820 includes a mono sensor which may be an example of the second image sensor 150 of FIG. 1.

In this embodiment, the processor 110 receives the ISO value for a current image from an ISO setting 880, and controls a color sensor driver 830 and a mono sensor driver 840 accordingly. The color sensor driver 830 and the mono sensor driver 840, in turn, control the on/off status of the color sensor module 810 and the mono sensor module 820, respectively. The color sensor module 810 in the active state operates to sense the received image and send the image to the processor 110 for processing. Similarly, the mono sensor module 820 in the active state operates to sense the received image and send the image to the processor 110 for processing. When the ISO value is between THa and THb, both the color sensor and the mono sensor are turned on and in the active state, but the processor 110 may choose one sensor; e.g., the color sensor module 810 to receive the image. Having both sensor modules 810 and 820 in the active state allows quick transition from single capture mode to dual capture mode on demand.

When not in the capture mode, the camera device may be in a preview mode that displays images on a display but does not capture the images into the memory. When the camera device is in the capture mode and the ISO value is greater than THb, both the color sensor module 810 and the mono sensor module 820 are in the active state and both of their outputs are processed by the processor 110 and combined by the de-noise module 850 to reduce the noise in the resulting captured image. When the camera device is in the capture mode and the ISO value is not greater than THb, only the color sensor module 810 output is used in generating the resulting captured image. The resulting captured image is sent to an image capture buffer, such as a JPEG (JPG) module 880.

Figure 9:
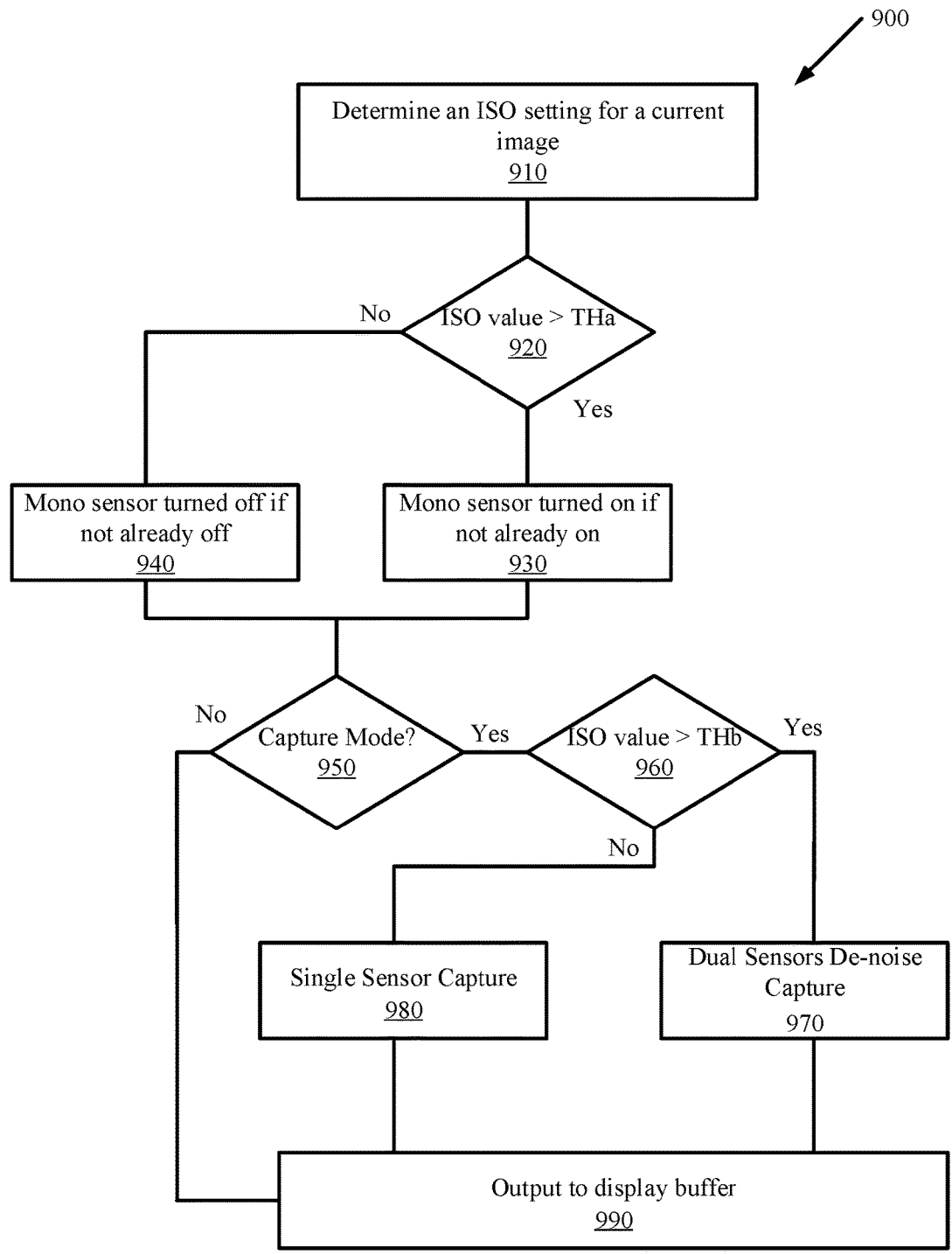
FIG. 9 is a flow diagram illustrating a power management process performed by the device of FIG. 8 according to another embodiment.

FIG. 9 is a flow diagram illustrating a power management process 900 for a camera device according to one embodiment. The process 900 may be performed by a device (e.g., the device 100 of FIG. 1, or more specifically, the processor 110 of FIG. 1 and FIG. 8).

The process 900 begins with the device determining the value of an ISO setting for a current image (step 910). If the value of the ISO setting ("ISO value") is greater than THa (step 920), the mono sensor is turned on (if it is not already on) to enter the active state, or stays on (if it is already on) (step 930). Otherwise, the mono sensor is turned off (if it is not already off), or stays off (if it is already off) (step 940). The device further determines whether the device is in a capture mode (step 950). If it is in the capture mode, the device further determines whether the ISO value is greater than THb (step 960). The device performs de-noising operations on a captured image using both the mono sensor and the color sensor if the ISO value is greater than THb (step 970). The device uses a single sensor (i.e., color sensor) to capture a received image if the ISO value is not greater than THb (step 980). The captured image is sent to an image capture buffer (step 990) for memory storage and for display. If at step 960 the ISO value is not greater than THb, then the device passes the received image to the display buffer (step 990) for display without image capture.

Figure 10:
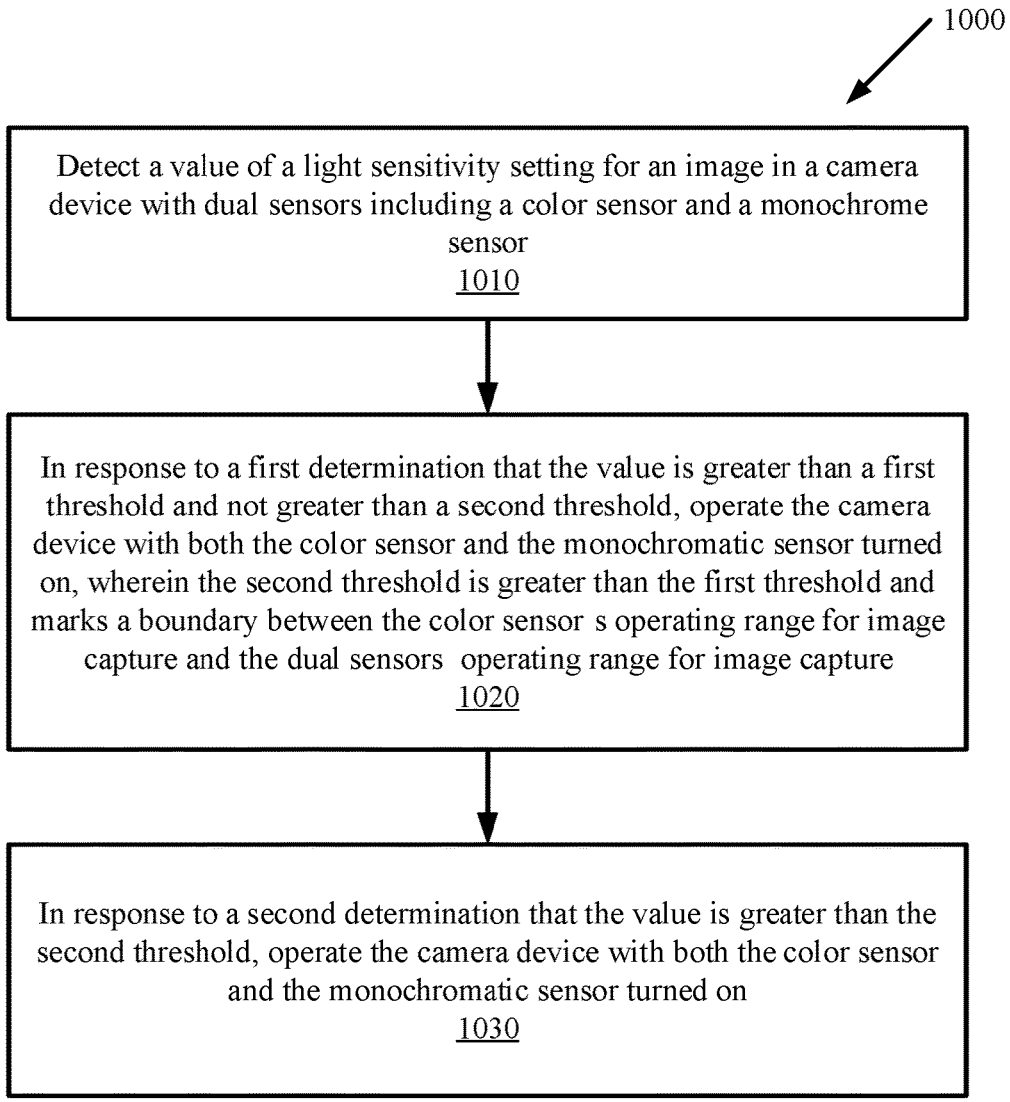
FIG. 10 is a flow diagram illustrating a power management method performed by a device having a color sensor and a monochromatic sensor according to one embodiment.

FIG. 10 is a flow diagram illustrating a method 1000 of power management for a camera device according to one embodiment. The method 1000 begins when the camera device with dual sensors, including a color sensor and a monochrome sensor, detects a value of a light sensitivity setting (e.g., an ISO value) for a current image (step 1010). In response to a first determination that the value is greater than a first threshold and not greater than a second threshold, the camera device operates with both the color sensor and the monochromatic sensor turned on (step 1020), where the second threshold is greater than the first threshold and marks a boundary between the color sensor's operating range for image capture and the dual sensors' operating range for image capture. In response to a second determination that the value is greater than a second threshold, the camera device operates with both the color sensor and the monochromatic sensor in the active state (step 1030). In one embodiment, when the camera device is in the capture mode, the results of the color sensor and the monochromatic sensor are combined to reduce noise in the resulting image.

The operations of the flow diagrams of FIGS. 5, 6, 9 and 10 have been described with reference to the exemplary embodiments of FIGS. 1, 4 and 8. However, it should be understood that the operations of the flow diagrams of FIGS. 5, 6, 9 and 10 can be performed by embodiments of the invention other than the embodiments discussed with reference to FIGS. 1, 4 and 8, and the embodiments discussed with reference to FIGS. 1, 4 and 8 can perform operations different than those discussed with reference to the flow diagrams. While the flow diagrams of FIGS. 5, 6, 9 and 10 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for power management of a camera device with dual sensors including a color sensor and a monochromatic sensor, comprising:
   detecting a value of a light sensitivity setting for an image;
   in response to a first determination that the value is greater than a first threshold and less than a second threshold, operating the camera device with both the color sensor and the monochromatic sensor turned on wherein the second threshold is greater than the first threshold and marks a boundary between the color sensor's operating range for image capture and the dual sensors' operating range for image capture; and in response to a second determination that the value is greater than a second threshold, operating the camera device with both the color sensor and the monochromatic sensor turned on.

2. The method of claim 1, wherein in response to the second determination when the camera device is in a capture mode, combining results of the color sensor and the monochromatic sensor.

3. The method of claim 1, further comprising:
in response to a third determination that the value is no greater than the first threshold, operating the camera device with the color sensor turned on and the monochromatic sensor turned off.

4. A camera device operative to perform power management, comprising:
dual sensors including a color sensor and a monochromatic sensor; and
a processor coupled to the color sensor and the monochromatic sensor, the processor operative to:
detect a value of a light sensitivity setting for an image;
in response to a first determination that the value is greater than a first threshold and less than a second threshold, operate with both the color sensor and the monochromatic sensor turned on wherein the second threshold is greater than the first threshold and marks a boundary between the color sensor's operating range for image capture and the dual sensors' operating range for image capture; and
in response to a second determination that the value is greater than a second threshold, operate with both the color sensor and the monochromatic sensor turned on.

5. The camera device of claim 4, wherein in response to the second determination when the camera device is in a capture mode, the processor is further operative to combine results of the color sensor and the monochromatic sensor.

6. The camera device of claim 4, wherein in response to a third determination that the value is no greater than the first threshold, the processor is further operative to operate the camera device with the color sensor turned on and the monochromatic sensor turned off.

\* \* \* \* \*